United States Patent
Harano

(10) Patent No.: US 6,535,718 B2
(45) Date of Patent: *Mar. 18, 2003

(54) PORTABLE PEN-BASED INFORMATION TERMINAL APPARATUS

(75) Inventor: Nobuya Harano, Shizuoka (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/270,010

(22) Filed: Mar. 16, 1999

(65) Prior Publication Data

US 2002/0013160 A1 Jan. 31, 2002

(30) Foreign Application Priority Data

Mar. 17, 1998 (JP) .......................... 10-067440

(51) Int. Cl.[7] ................................................ H04B 1/38
(52) U.S. Cl. .................. 455/90; 455/550; 455/556; 455/566; 343/702
(58) Field of Search .................... 455/90, 550, 556, 455/566, 575; 343/702, 895, 900, 901, 906; 178/19.01

(56) References Cited

U.S. PATENT DOCUMENTS

| 5,644,320 | A | * | 7/1997 | Rossi | 343/702 |
| 5,739,793 | A | * | 4/1998 | Adachi | 343/702 |
| 5,933,783 | A | * | 8/1999 | Kawakami et al. | 455/550 |
| 5,956,656 | A | * | 9/1999 | Yamazaki | 455/575 |

FOREIGN PATENT DOCUMENTS

| JP | 7-311737 | 11/1995 |
| JP | 7-336759 | 12/1995 |
| JP | 9-191207 | 7/1997 |

* cited by examiner

Primary Examiner—Edward F. Urban
Assistant Examiner—Temica M. Davis
(74) Attorney, Agent, or Firm—Sughrue Mion, PLLC

(57) ABSTRACT

A portable pen-based information terminal apparatus includes a housing which includes a display and input section, a pen storing section, a communicating section, and an antenna device. The communicating unit and the antenna device are integrally disposed in the housing. The apparatus further includes an input pen to be inserted in and to be removed from the pen storing section of the housing. The pen is capable of displaying items on the display and input section. The pen storing section is disposed in the antenna device. This resultantly minimizes the size, weight, and cost of the apparatus.

10 Claims, 6 Drawing Sheets

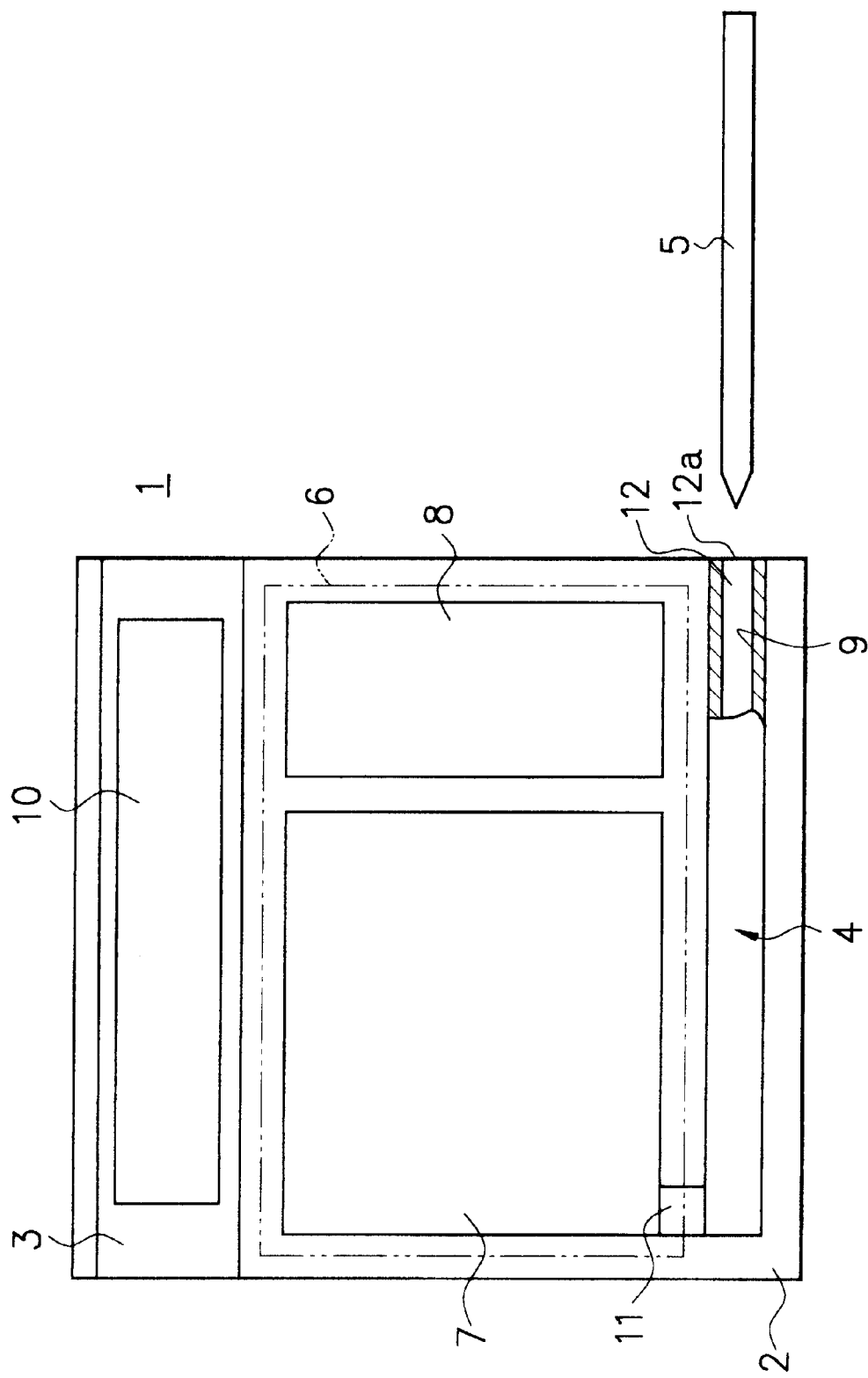

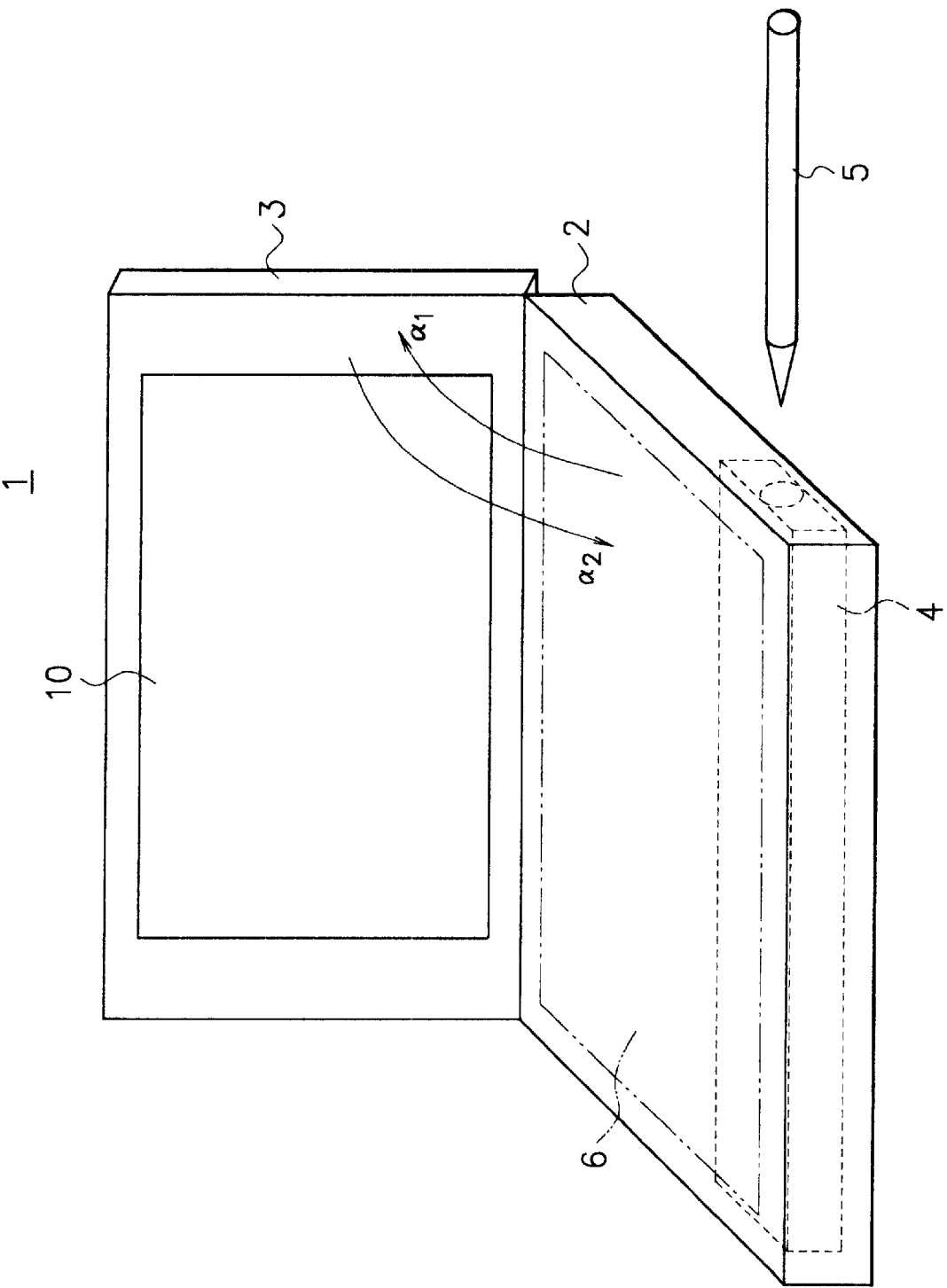

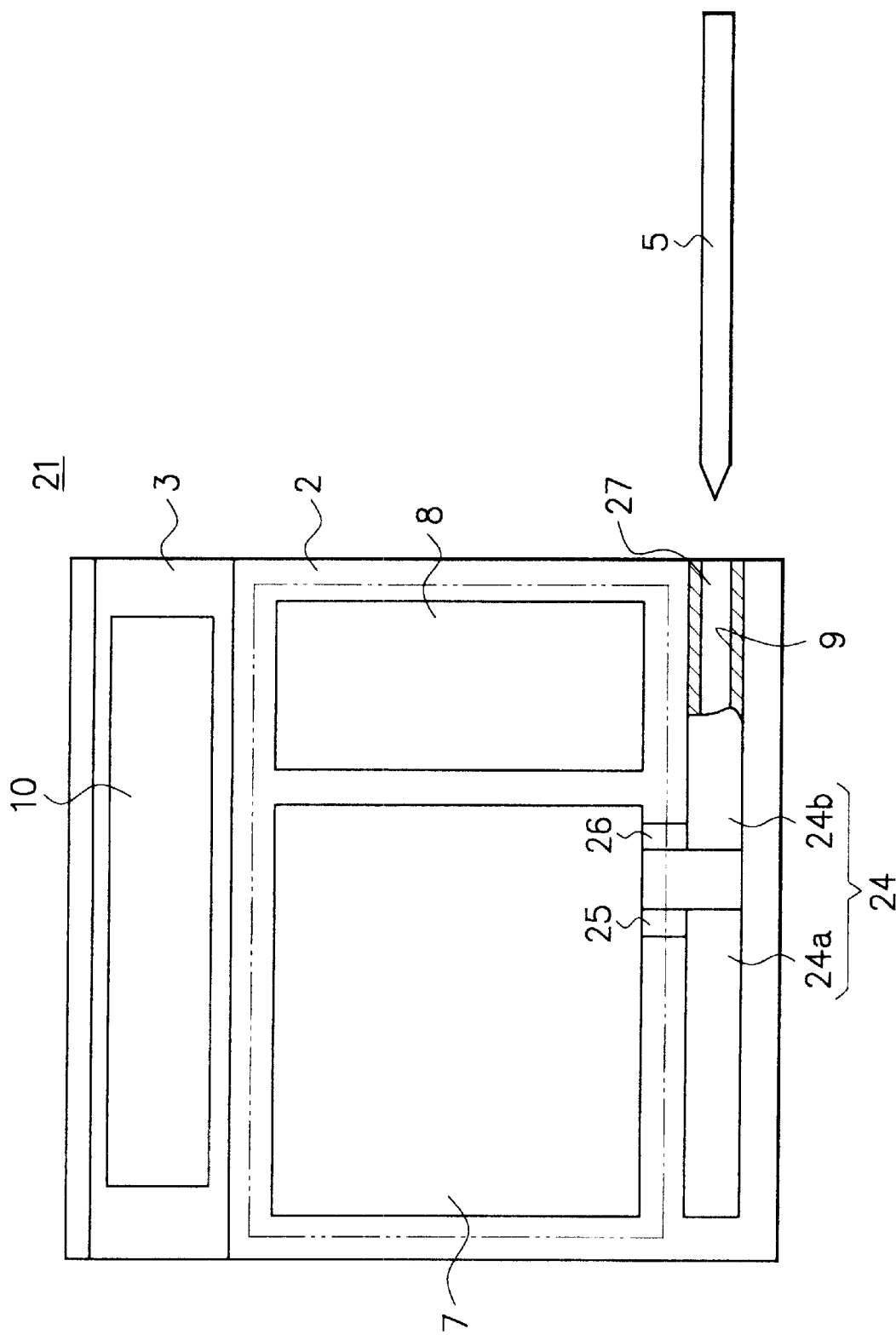

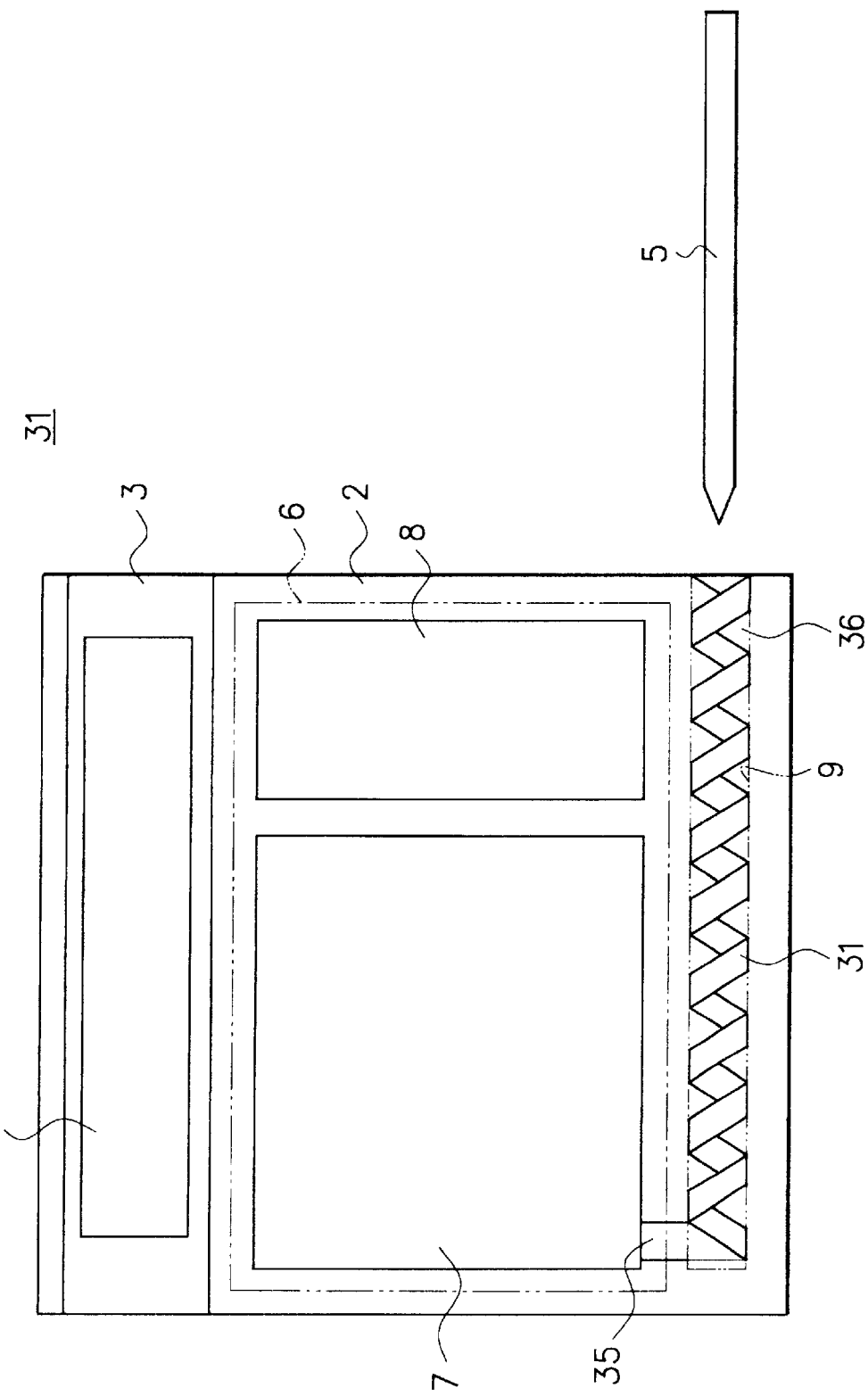

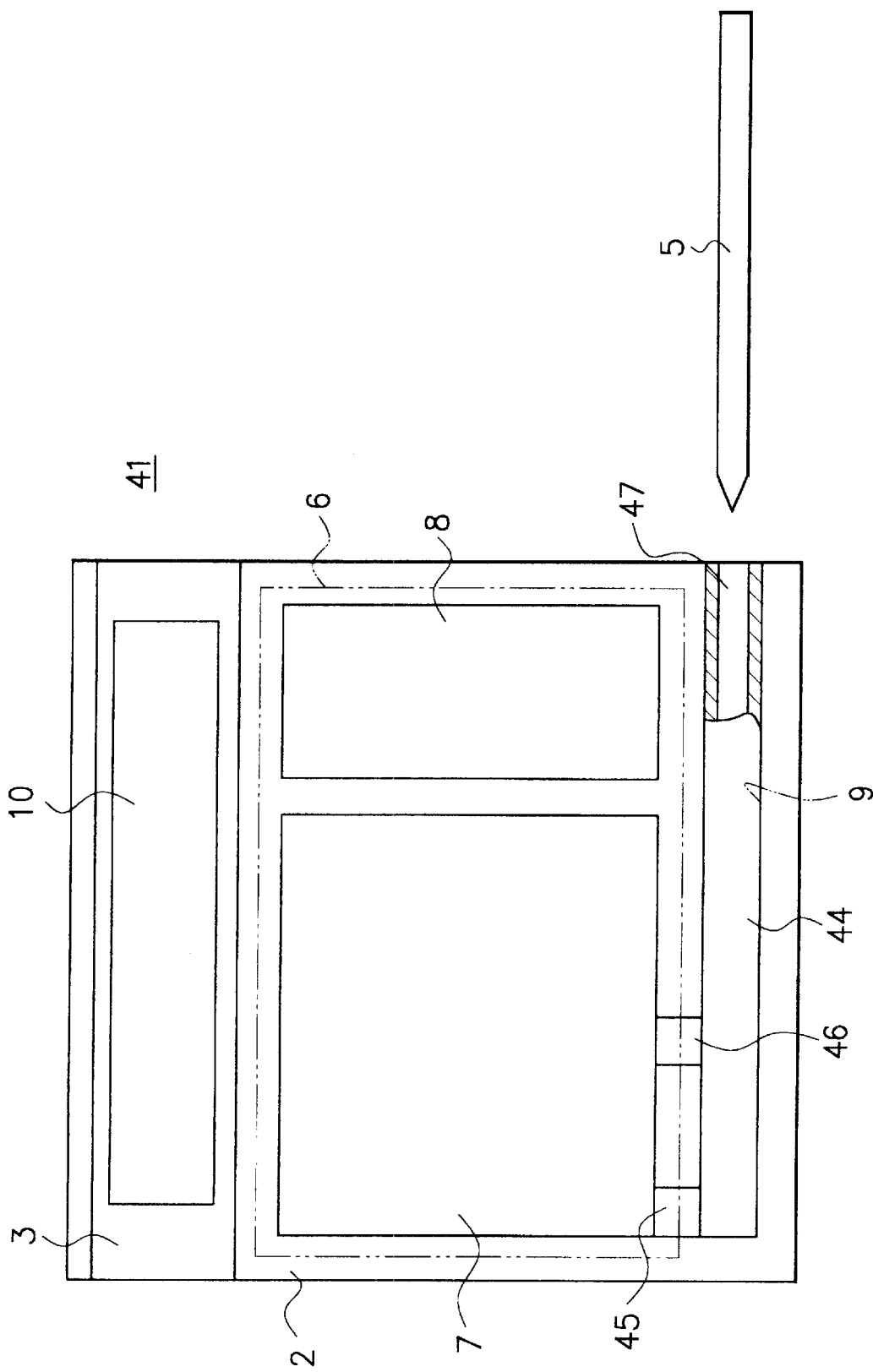

PORTABLE PEN-BASED INFORMATION TERMINAL APPARATUS

BACKGROUND OF THE INVENTION

The present invention relates to a portable pen-based information terminal apparatus suitably applicable to mobile communication media integrally including, for example, a transmitter-receiver.

Description of the Prior Art

Recently, portable information terminal apparatuses have been rapidly popularized and have been broadly utilized with, for example, various mobile communication media.

In operation of such a portable information terminal apparatus, information (radio wave) is communicated by E-mail or facsimile through a telephone line or a portable wireless unit such that realtime information can be obtained while the terminal apparatus is moving.

Heretofore, a portable information terminal apparatus of this kind includes a housing including a pen storing section and a keyboard integrally including a communication section and a control section; a cover or lid including a display, i.e., a display and input section, and an input pen which is insertable into and removable from the pen storing section.

When using the information terminal apparatus as an information input unit or an information communicating device, data is inputted by the input pen or from the keyboard to be displayed on the display.

Each of the information terminal apparatuses inevitably includes an antenna to communicate information. These apparatuses are classified depending on a type of the antenna. Namely, the antenna is exposed (exposed antenna type) or is internally disposed (internal antenna type).

The information terminal apparatus of the internal antenna type is superior in portability as well as in constructional strength to the apparatus of the exposed antenna type.

However, in relation to communication characteristics, the information terminal apparatus of the internal antenna type is inferior to that of the exposed antenna type and hence requires a large space between the antenna and a noise source including an electric circuit.

More specifically, many noise sources exist in the housing and hence noises from these sources adversely influence the antenna if the large space is not provided. This leads to a troublesome hindrance in communication of radio waves.

This resultantly leads to a problem that the size of the housing of the information terminal apparatus becomes greater and hence the overall size thereof is increased.

In this connection, it has been a common practice that the noise source is covered with a metallic shield to minimize the influence of noises from the noise source. However, this results in a problem that the cost of the information terminal apparatus is soared, the overall weight of the apparatus is increased, and portability thereof is deteriorated.

In regard to these problems, there has been described a portable pen-based information terminal apparatus of an internal antenna type in the Japanese Patent Laid-Open Publication Serial No. 9-191207, the apparatus having desired communication characteristics with satisfactory portability.

The apparatus includes an antenna which serves also as a touch-pen and which can be used to input data from a display and input section.

However, the technology of the Japanese Patent Laid-Open Publication Serial No. 9-191207 is attended with problems as follows.

Namely, in a terminal apparatus of which a touch-pen integrally includes an antenna device, when the touch-pen is installed in a pen storing space of a housing of the apparatus, there can be obtained a desired antenna characteristic. However, the antenna characteristic is deteriorated when the touch-pen is removed from the space to input data by use thereof.

Additionally, in a case in which the touch-pen and the antenna are fabricated in an unit, when the touch-pen is lost, it is impossible for the apparatus to receive radio waves.

Furthermore, when the antenna device is integrally disposed in the touch pen, there is required a contact point between a wireless unit and the antenna device. There inevitably occurs contact resistance at such a mechanical contact point, which leads to a disadvantage that the antenna loss is increased.

SUMMARY OF THE INVENTION

It is therefore an object of the present invention to provide a portable pen-based information terminal apparatus including a pen storing section and an antenna device in which in consideration of a long distance between the pen storing section and the noise source, the antenna device includes the pen storing section to thereby decrease the size, weight, and cost of the terminal apparatus.

In accordance with the present invention, there is provided a portable pen-based information terminal apparatus, which includes a housing including a display and input section, a pen storing section, a communicating unit, and an antenna device, the communicating unit and the antenna device being integrally disposed in the housing. The apparatus further includes an input pen insertably and removably arranged in the pen storing section of the housing and capable of displaying items on the display and input section. The pen storing section is formed in the antenna device.

Thanks to the configuration, the antenna device is mounted at a position sufficiently apart from a noise source to advantageously obtain satisfactory communication characteristics.

In the portable pen-based information terminal apparatus of the present invention, the antenna device including the pen storing section is disposed along a front end edge of the housing.

Therefore, the antenna device is located at a position substantially most apart from a noise source in the housing.

In the portable pen-based information terminal apparatus of the present invention, the antenna device includes a mono-pole antenna device.

In consequence, the mono-pole antenna device is located at a position sufficiently apart from a noise source to thereby attain desired communication characteristics.

In the portable pen-based information terminal apparatus in accordance with the present invention, the mono-pole antenna device is constructed in a form of a hexahedron.

Due to the structure, the mono-pole antenna device is installed at a position having a distance from a noise source, the distance being enough to obtain satisfactory communication characteristics.

In the portable pen-based information terminal apparatus of the present invention, the antenna device includes a helical antenna device.

Thanks to the constitution, the helical antenna device is located at a position which is sufficiently apart from a noise source to obtain desired communication characteristics.

In the portable pen-based information terminal apparatus in accordance with the present invention, the antenna device includes a helical antenna device having a form of an inverted F.

Consequently, the inverted-F-shaped antenna device is disposed at a position enough to be apart from a noise source to obtain desired communication characteristics.

In the portable pen-based information terminal apparatus of the present invention, the antenna device includes a loop antenna device.

Thanks to the construction, the loop antenna device is located at a position sufficiently apart from a noise source, which leads to satisfactory communication characteristics.

BRIEF DESCRIPTION OF THE DRAWINGS

The objects and features of the present invention will become more apparent from the consideration of the following detailed description taken in conjunction with the accompanying drawings in which:

FIG. 1 is a plan view showing an outline of a first embodiment of a portable pen-based information terminal apparatus in accordance with the present invention;

FIG. 2 is a perspective view showing an outline of the first embodiment of FIG. 1;

FIG. 3 is a plan view showing an outline of a second embodiment of a portable pen-based information terminal apparatus in accordance with the present invention;

FIG. 4 is a plan view showing an outline of a third embodiment of a portable pen-based information terminal apparatus in accordance with the present invention;

FIG. 5 is a plan view showing an outline of a fourth embodiment of a portable pen-based information terminal apparatus in accordance with the present invention;

DESCRIPTION OF THE PREFERRED EMBODIMENTS

Figure 6A:
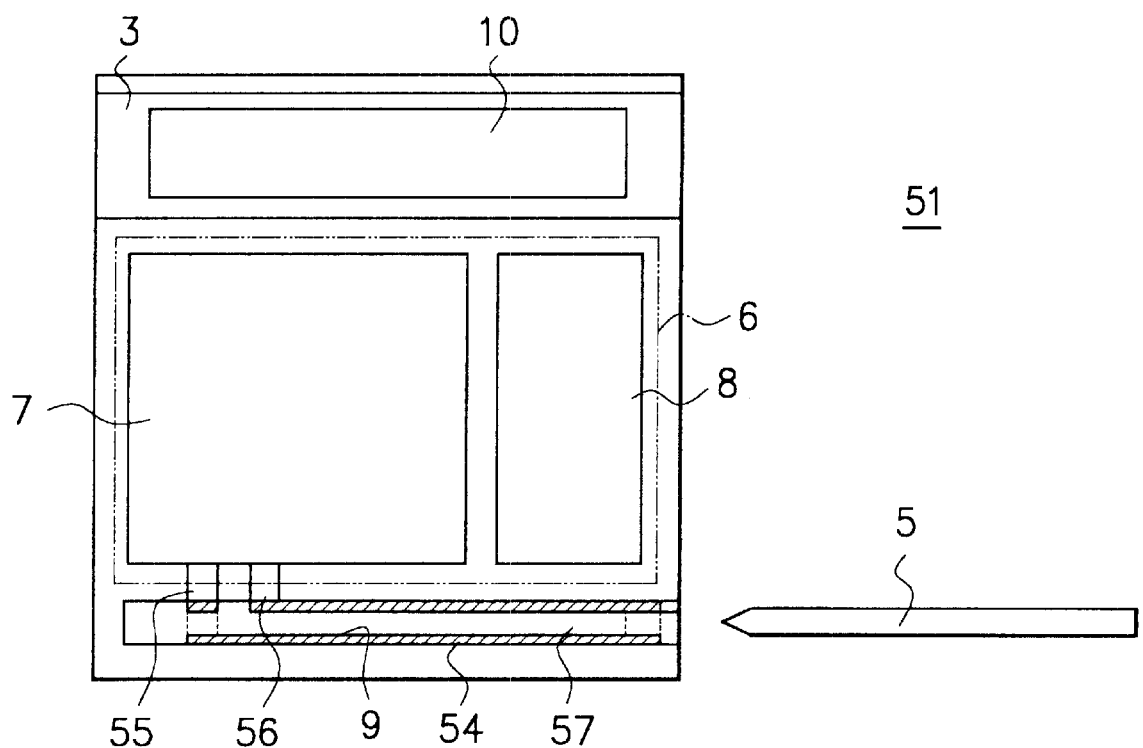
FIG. 6A is a plan view showing an outline of a fifth embodiment of a portable pen-based information terminal apparatus in accordance with the present invention.

Referring next to the accompanying drawings, description will be given of an embodiment of a portable pen-based information terminal apparatus in accordance with the present invention.

FIGS. 1 and 2 respectively show in a plan view and a perspective view appearances of a first embodiment of a portable pen-based information terminal apparatus in accordance with the present invention.

The portable pen-based information terminal apparatus indicated by a reference numeral 1 in FIGS. 1 and 2 includes an apparatus housing 2, an apparatus lid or cover 3, an antenna device 4, and an input pen 5.

The housing 2 includes a keyboard 6 in an upper surface portion thereof and integrally includes a wireless or radio (transmitter-receiver) section 7 and a control section 8. The housing 2 is entirely fabricated with a synthetic resin. In the housing 2, there is disposed an antenna device storing space 9 having substantially a cylindrical contour, the space being configured to store the antenna device 4 therein. The space 9 is disposed at a front end edge of the housing 2.

The lid 3 is rotatably and pivotably fixed on the housing 2. Specifically, when the apparatus 1 is to be operated, the lid 3 is rotated or lifted upward in a direction of an arrow mark al from a closed state to an open state. Contrarily, when the apparatus is to be out of operation, the lid 3 is rotated in a direction of an arrow mark α2. The lid 3 is entirely manufactured with a synthetic resin and includes therein a display and input section 10 such as a liquid-crystal display.

The antenna device 4 includes a mono-pole antenna device having an overall shape of a hexahedron and is installed in the space 9 to be connected via a contact terminal 11 to the radio section 7 in a form of a letter L in a cross-sectional view. Therefore, the antenna 4 is located at a position substantially most apart from a front end edge of the housing 2, i.e., a noise source.

The radio section 7 and the controller 8 serve as a grounding conductor for the antenna device 4.

In this description, the antenna 4 is arranged at a front end edge of the housing 2 to facilitate insertion and removal of the pen 5 into and from a pen storing space, which will be described later. However, it may also be possible in accordance with the present invention that the antenna 4 is disposed at an rear end edge or a side end edge of the housing 2.

Additionally, in the description above, although the antenna 4 is a mono-pole antenna device in a form of a hexahedron in an aspect of the present invention, the mono-pole antenna device may be manufactured in a cylindrical form.

In an operation to transmit information from the apparatus configured as above, when a transmission of information is instructed from the display and input section 10 or the keyboard 6, the information is sent via the controller 8 and the radio section 7 to the antenna device 4 to be transmitted as a radio wave therefrom.

On the other hand, in an operation to receive information, the antenna 4 receives a radio wave of information via a radio channel. The information is then sent through the radio section 7 to the control section 8.

In the antenna device 4, there is provided a pen storing space 12 having a pen insertion entry 12a on one end thereof so that the pen 5 is inserted into and removed from the space 12. In this configuration, when the apparatus 1 is in operation, the pen 5 is removed from the space 12 to display and to input data items on and from the display and input section 10. When the apparatus is out of operation, the pen 5 is inserted into the space 12.

The pen 5 is an input pen capable of displaying and inputting data items on and from the display and input section 10. The pen 5 is disposed to be insertable into and removable from the pen storing space 12 of the antenna device 4.

In the portable pen-based information terminal apparatus constructed as above, the antenna 4 is located at a position having a sufficient distance from a noise source to obtain desired communication characteristics.

In the structure, excepting a portion of the antenna 4, the antenna device 4 is covered with a synthetic resin of the housing 2. That is, the antenna device 4 is apart from any metallic member of the apparatus, which is quite favorable to improve characteristics of the antenna 4.

Consequently, in accordance with this embodiment, a large space conventionally required between the antenna and the noise source including an electric circuit can be dispensed with. This resultantly minimizes the outer dimension or size of the housing 2.

In addition, in accordance with the embodiment above, the metallic shield used in the prior art to cover the noise source to reduce influence from noises generated by the noise source is not required, which advantageously lowers the weight of the housing 2.

Referring now to FIG. 3, description will be given of a second embodiment of the portable pen-based information terminal apparatus in accordance with the present invention.

FIG. 3 shows in a plan view an outline of the second embodiment of the portable pen-based information terminal apparatus. In the plan view, the same constituent elements as those of FIGS. 1 and 2 are assigned with the same reference numerals and will not be described in detail.

The portable pen-based information terminal apparatus indicated by a reference numeral 21 in FIG. 3 includes a housing 2, a lid 3, an antenna device 24, and an input pen 5.

The antenna 24 includes a dipole antenna device including two cylindrical antenna elements 24a and 24b. The antenna 24 is arranged in an antenna device storing space 9 to be connected via connecting terminal sections 25 and 26 to a radio section 7.

In the antenna device 24, there is provided a pen storing space 27 so that the pen 5 is inserted into and removed from the space 27.

In the apparatus 21 thus constructed, as in the first embodiment, the housing 2 can be advantageously reduced in outer dimension as well as in weight.

Subsequently, description will be given of a third embodiment of the portable pen-based information terminal apparatus in accordance with the present invention by referring to FIG. 4.

FIG. 4 is a plan view schematically showing the third embodiment of the portable pen-based information terminal apparatus.

The portable pen-based information terminal apparatus designated by a reference numeral 31 in FIG. 4 includes a housing 2, a lid 3, an antenna device 34, and an input pen 5.

The antenna 34 includes a helical antenna device having an axial line substantially aligned with that of an antenna element storing space 9. The antenna 34 is disposed in the antenna device storing space 9 and is linked via a connecting terminal section 35 to a radio section 7.

As in the first and second embodiments, the housing of the apparatus 31 structured above can be minimized in outer dimension and in weight.

Referring next to FIG. 5, description will be given of a fourth embodiment of the portable pen-based information terminal apparatus in accordance with the present invention.

FIG. 5 shows in a plan view an outline of the fourth embodiment of the portable pen-based information terminal apparatus.

The portable pen-based information terminal apparatus is represented by a reference numeral 41 in FIG. 4 and includes a housing 2, a lid 3, an antenna device 44, and an input pen 5.

The antenna 44 includes a cylindrical antenna device having an inverted F shape. The antenna 44 is arranged in an antenna device storing space 9 to be connected via connecting terminal sections 45 and 46 to a radio section 7.

In the antenna device 44, there is provided a pen storing space 47 so that the pen 5 is inserted into and removed from the space 47.

In the apparatus 41 having the constitution above, as in the first to third embodiments, the outer dimension and the weight of the housing 2 can be advantageously reduced.

Figure 6B:
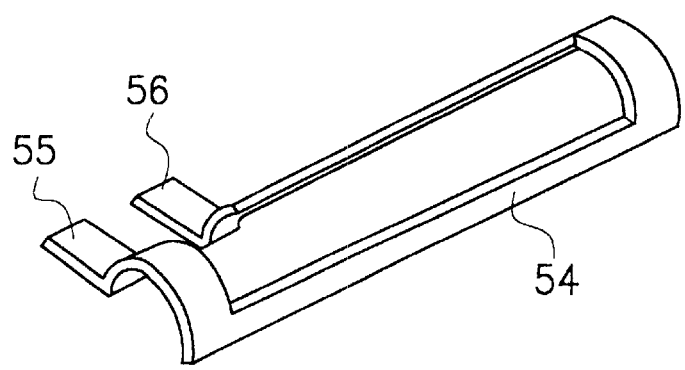
FIG. 6B is a perspective view showing a loop antenna of the fifth embodiment.

Referring now to FIGS. 6A and 6B, description will be given of a fifth embodiment of the portable pen-based information terminal apparatus in accordance with the present invention.

FIGS. 6A and 6B are plan views schematically showing a configuration of the fifth embodiment of the portable pen-based information terminal apparatus.

The portable pen-based information terminal apparatus indicated by a reference numeral 51 in FIGS. 6A and 6B includes a housing 2, a lid 3, an antenna device 54, and an input pen 5.

The antenna 54 includes a loop antenna device which is disposed in the antenna device storing space 9 to be linked via connecting terminal sections 55 and 56 to a radio section 7.

In the antenna device 54, there is provided a pen storing space 57 so that the pen 5 is inserted into and is removed from the space 57.

As in the first to fourth embodiments, the housing of the apparatus 51 thus constructed can be minimized in outer dimension as well as in weight.

In the description of the embodiments above, the present invention is applied to a terminal apparatus including a transmitting and receiving function. However, the present invention is not restricted by the embodiments, namely, it is to be appreciated that the present invention is similarly applicable to any terminals having either one of the transmitting and receiving functions.

In accordance with the present invention described above, since the pen storing space is provided in the antenna device integrally arranged in the housing of the apparatus, the antenna device is located at a position sufficiently apart from the noise source, which makes it possible to obtain desired communication characteristics.

Consequently, since there is not required the large space necessarily disposed between the antenna and the noise source in the conventional technology, the outer dimension of the housing can be reduced and the overall size of the portable pen-based information terminal apparatus can also be minimized.

Moreover, since the metallic shield conventionally required to cover the noise source to minimize influence of noises therefrom becomes unnecessary, the cost of the apparatus can be lowered and the housing and hence the overall apparatus can be minimized in weight.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A portable pen-based information terminal apparatus, comprising:

a housing including a display and input section, a pen storing section, a communicating unit, and an antenna device, the communicating unit and die antenna device being integrally disposed in the housing; and an input pen insertably and removably arranged in the pen storing section of the housing and capable of displaying items on the display and input section, the pen storing section being formed in the antenna device, wherein the antenna device does not protrude from the housing during transmission and receiving of data, and wherein the input pen is completely separable from the antenna device in a first position, and is completely inserted into the pen storing section in a second position so as to be surrounded by the antenna device.

2. A portable pen-based information terminal apparatus in accordance with claim 1, wherein the antenna device including the pen storing section is disposed along a front end edge of the housing.

3. A portable pen-based information terminal apparatus in accordance with claim 1, wherein the antenna device includes a monopole antenna device.

4. A portable pen-based information terminal apparatus in accordance with claim 3, wherein the monopole antenna device is configured in a form of a cylindrical body.

5. A portable pen-based information terminal apparatus in accordance with claim 1, wherein the antenna device includes a helical antenna device.

6. A portable pen-based information terminal apparatus in accordance with claim 1, wherein the antenna device includes an inverted F form antenna.

7. A portable pen-based information terminal apparatus in accordance with claim 1, wherein the antenna device includes a loop antenna device.

8. A portable pen-based information terminal apparatus, comprising:

a housing including a display and input section, a pen storing section, a communicating unit, and an antenna device, the communicating unit and the antenna device being integrally disposed in the housing; and an input pen insertably and removably arranged in the pen storing section of the housings and capable of displaying items on the display and input section, the pen storing section being formed in the antenna device, wherein the antenna device extends inwardly along an inner portion of the housing, and wherein the antenna device does not protrude from the housing during transmission and receiving of data, and wherein the input pen is completely separable from the antenna device in a first position, and is completely inserted into the pen storing section in a second position so as to be surrounded by the antenna device.

9. A portable pen-based information terminal apparatus in accordance with claim 8, wherein said antenna device is disposed at an end edge of the housing, so as to extend along the end edge.

10. A portable pen-based information terminal apparatus in accordance with claim 8, wherein said antenna device extends substantially a length of the pen.

* * * * *